United States Patent [19]

Skibo

[11] 3,907,093

[45] Sept. 23, 1975

[54] TUNNELING MACHINE

[75] Inventor: Phillip M. Skibo, Yonkers, N.Y.

[73] Assignee: Northwest Engineering Company, Green Bay, Wis.

[22] Filed: Dec. 17, 1973

[21] Appl. No.: 425,212

[52] U.S. Cl. .................... 198/10; 37/107; 214/91; 299/64
[51] Int. Cl.² ........................................ B65G 65/06
[58] Field of Search ............... 198/10, 7 R; 214/91; 299/64, 65, 66, 67; 37/4, 107, 111, 112, 110

[56] References Cited
UNITED STATES PATENTS

| | | | |
|---|---|---|---|
| 1,581,705 | 4/1926 | Waxbom | 198/10 |
| 1,729,177 | 9/1929 | Morgan | 198/7 R |
| 2,099,981 | 11/1937 | Joy | 198/10 |
| 3,531,161 | 9/1970 | Conn | 299/67 X |

FOREIGN PATENTS OR APPLICATIONS

| | | | |
|---|---|---|---|
| 686,023 | 5/1964 | Canada | 299/64 |

*Primary Examiner*—Evon C. Blunk
*Assistant Examiner*—Douglas D. Watts
*Attorney, Agent, or Firm*—Andrus, Sceales, Starke & Sawall

[57] ABSTRACT

Tunneling machine having a pair of scraper assemblies independently controllable by two operators in side-by-side relation in an operator's cab overlying the forward lower receiving end of an inclined conveyor, the scraper assemblies including scrapers arranged to dig into material forwardly from the machine and to move the material rearwardly into the receiving end of the conveyor. The scraper assemblies are pivotal about vertical axes to project the scrapers outwardly and to cut a wide swath. The machine is moved forwardly by traction motors coupled to front wheels and in addition, a draw cable is provided having a rearward end wound on a motor-driven drum and having a forward end connectable to the forward end of rails and the forward end of a rail support bed, the machine being preferably movable on rails. A pair of wings are provided on opposite sides of the forward end of the machine for acting as a ballast and stabilizing machine and for acting to clean up the sides of the tunnel and to assist in moving material into the conveyor.

3 Claims, 3 Drawing Figures

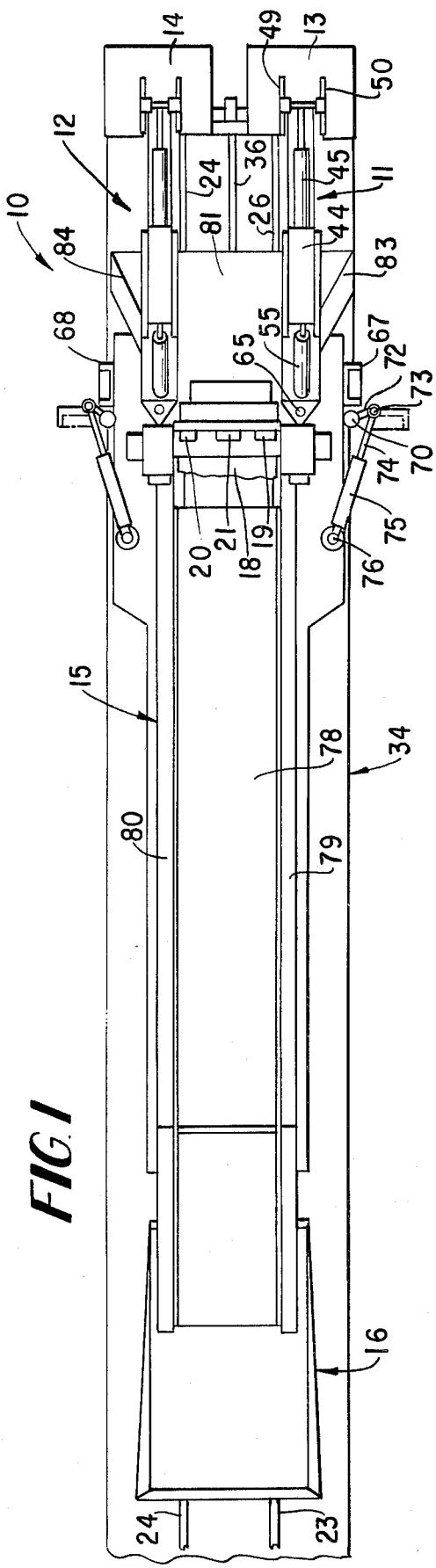
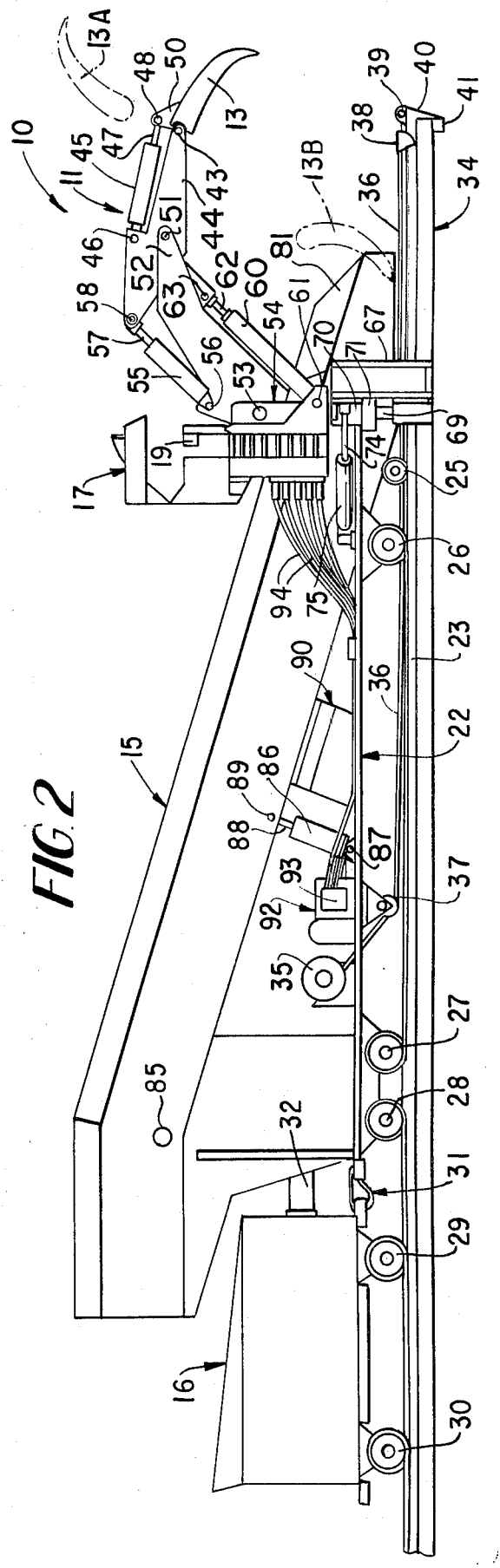

TUNNELING MACHINE

BACKGROUND OF THE INVENTION

I. Field of the Invention

This invention relates to a tunneling machine and more particularly to a tunneling machine which is highly efficient in operation, operative to rapidly move large amounts of material into railroad cars or the like and which is rugged and highly reliable as well as being readily controllable and versatile, being usable in a variety of applications.

II. Background of the Prior Art

Various machines have been proposed in the prior art for tunneling and similar loading purposes. In general, such machines have been designed for specific applications and have had limited utility, have been limited with respect to the amount of material which can be moved relative to the size thereof, and have also been difficult to operate and control. Prior art machines have also not always been reliable. For example, one problem has been that when attempting to move large amounts of material or to dig into hard or mucky materials, the machine may shift in position. This problem is particularly troublesome in the case of machines designed to move over support rails in that the machine may become derailed. Traction has also been a problem and another problem has arisen in attempting to clear material in a wide swath and in developing a wide level surface.

SUMMARY OF THE INVENTION

This invention was evolved with the general object of overcoming the disadvantages of prior art machines and of providing a machine usable for tunneling and similar operations and which will efficiently, reliably and rapidly move large amounts of materials while being readily controllable and versatile.

In a machine constructed in accordance with this invention, inclined conveyor means are provided arranged to carry material from a forward lower receiving end to an elevated rearward delivery end from which the material may drop to a conventional tunnel type railroad car or the like. An operator's cab is supported from a forward end portion of the frame of the machine and extends over the conveyor means for supporting two operators in side-by-side relation. Scraper means are provided including a pair of scraper assemblies on opposite sides of the conveyor means, each of the assemblies comprising means for digging into material ahead of the machine and moving the material rearwardly toward the receiving end of the conveyor, with separate and independent control means being provided for the scraper assemblies, for independent operation thereof by the two operators in the cab. With this combination, the material can be moved much more rapidly into the conveyor because of the use of two operators each having independent control of his scraper assembly.

In accordance with a specific feature, each of the scraper assemblies is pivotal about a vertical axis, allowing the scrapers to be extended to the sides, ahead of regions on opposite sides of the machine, thus permitting the machine to remove material from a wide swath. Another feature relates to an articulated support of the scrapers such as to permit maximum efficiency in digging into and moving material to the conveyor means.

Another important feature of the invention relates to the provision of a pair of wings supported from the main frame of the machine on opposite sides of the forward end thereof and performing a number of important functions. First, the wings are quite heavy and serve as out-riggers to keep the machine in a stable position in extreme uses and also operate as ballast to keep the front of the machine down, which is particularly important when the machine is movable on support rails, and keeping the machine from becoming derailed. The wings also serve as a clean-up device to keep the sides of the tunnel clean as the machine moves forwardly, making it unnecessary to return to clean sides of the tunnel. In addition, the wings serve to aid in moving material to the conveyor.

In accordance with a specific feature, the wings are pivotal about vertical axes to permit more efficient use thereof and also to permit them to be positioned to reduce the overall width of the machine when it is moved through a narrow opening. In addition, the vertical position of the wings may be adjusted.

It should be noted that the wings are particularly desirable in combination with the arrangement in which the two scraper assemblies are pivotal about vertical axes, in insuring stability of the machine.

Another important feature relates to drive means for the machine, including a cable having a rearward end portion wound on a motor-driven drum and extending under the machine to a forward end which is securely fastened to a fixed point. Preferably, in the case of a machine movable on support rails, the forward end of the cable is secured to the forward end of the rails and also to an underlying support bed or "flying carpet" which supports the rails. With this arrangement, a very large propulsion force can be developed.

The cable is preferably so arranged that tensioning thereof is effective to exert forces resisting upward movement of the forward end of the machine, thereby contributing to the stability thereof. Preferably, pulley means are provided engaging the cable between the drum and the forward end of the cable, the pulley means being located behind the center of gravity of the machine.

The drive means also includes traction drive motors, connected to forward drive wheels of the machine, which may be used in conjunction with the cable, the tensioning of the cable serving to increase traction between the forward wheels and the support rails or other wheel-supporting surfaces.

This invention contemplates other objects, features and advantages which will become more fully apparent from the following detailed description taken in conjunction with the accompanying drawings.

BRIEF DESCRIPTION OF THE DRAWINGS

FIG. 1 is a top plan view of a tunneling machine constructed in accordance with the principles of this invention;

FIG. 2 is a side elevational view of the machine of FIG. 1; and

DESCRIPTION OF A PREFERRED EMBODIMENT

Figure 3:
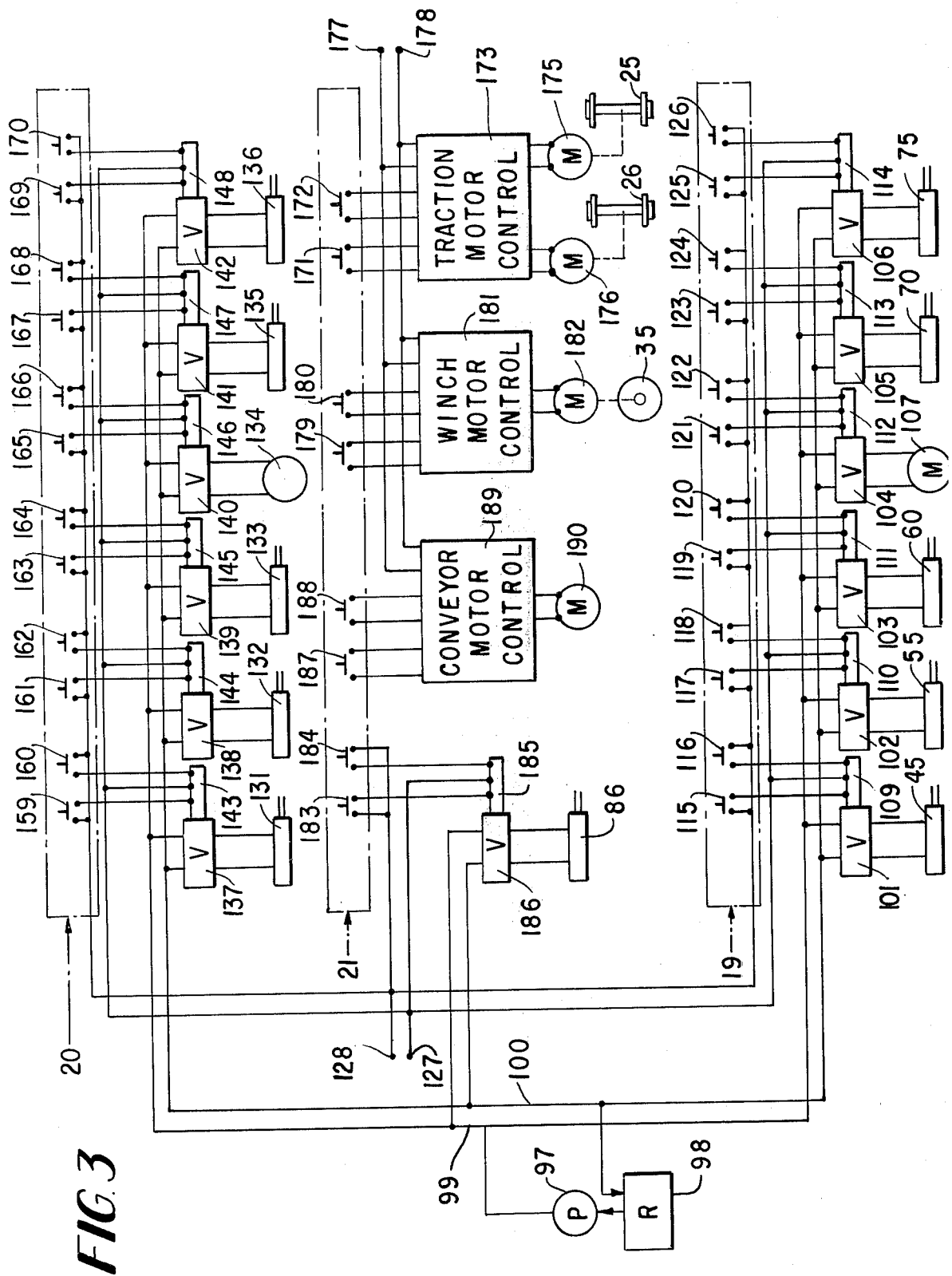
FIG. 3 is a schematic diagram of hydraulic and electrical controls for the machine of FIGS. 1 and 2.

Reference numeral 10 generally designates a machine constructed in accordance with the principles of this invention, designed for use in tunnels for removing material therefrom, but having a variety of applications. In general, the machine 10 comprises material gathering means in the form of a pair of independently controllable scraper assemblies 11 and 12 including scrapers 13 and 14 arranged for digging into material ahead of the machine and for moving the material rearwardly to the lower forward receiving end of a conveyor structure 15 operative to move the material rearwardly and upwardly to an elevated rearward delivery end from which the material drops into a car 16 such as a conventional rail-supported mine car.

An operator's cab structure 17 is disposed over the forward end of the conveyor structure 15 and includes a seat 18 on which two operators may sit in side-byside relation to operate control units 19 and 20 for independent control of the scraper assemblies 11 and 12 and to also operate a central control unit 21 for control of other functions including the forward and rearward drive of the machine, the control unit 21 being accessible to both operators. The scraper assemblies 11 and 12, the conveyor structure 15 and the operators' cab 17 are supported from a main frame structure 22 which is supported for movement on rails 23 and 24 by two pairs of flanged front wheels 25 and 26 and two pairs of flanged rear wheels 27 and 28. The car 16 is of conventional construction, including front and rear flanged wheel pairs 29 and 30, and it is coupled to the machine 10 by a conventional draw bar and mine coupler 31, a bumper 32 being carried from the main frame structure 22. The rails 23 and 24 are supported on a "flying carpet" or bed 34 to which sections may be added to support additional rails as the removal of material progresses.

Drive means are provided for moving the machine along the rails 23 and 24. In accordance with an important feature, a winch arrangement is provided including a drum 35 journalled for rotation on a horizontal axis transverse to the direction of travel and including a cable 36 having a rearward end portion wound on the drum 35. The cable 36 extends downwardly and forwardly under a pulley 37 and thence forwardly at a level a short distance above and generally parallel to the level of the rails 23 and 24. The forward end of the cable 36 is connected to the center of a cross member 38 the opposite ends of which engage the ends of the rail 23 and 24, and a forwardly projecting arm 39 on the cross member 38 is connected through a short length of cable 40 to a hook 41 engaged under the forward end of the bed 34. Drum 35 is driven through a gear reduction unit from an electric motor to tension the cable 36 and to develop a very large force urging the machine forwardly. The drum 35 and pulley 37 located behind wheels 25, 26 and to the rear of the center of gravity of the machine so that tensioning of the cable 36 is effective to hold the pairs of front wheels 25 and 26 on the rails 23 and 24 and to prevent them from being lifted off the rails through operation of the scraper assemblies 11 and 12.

The drive means further includes hydraulic motor means for driving the pairs of front wheels 25 and 26 as described hereinafter in connection with the schematic hydraulic and electrical diagram of FIG. 3. It is noted that the cable 36 and the traction drive are usable together, the front wheel holddown effect obtained by tensioning of the cable 36 being highly advantageous in this respect, in increasing the traction between the front wheels and the rails.

The scraper assemblies 11 and 12 have the same construction. The scraper 13 of the assembly 11 is pivotally connected by a pin 43 to the forward end of an arm 44 and the rearward end of a hydraulic cylinder 45 is connected to the arm 44 by a pin 46 with the forward end of a piston rod 47 being connected to a pin 48 extending between a pair of plates 49 and 50 upstanding from the scraper 13. At an intermediate point, the arm 44 is pivotally connected by a pin 51 to an arm 52 having a rearward end pivotally connected by a pin 53 to a support 54. A hydraulic cylinder 55 has a rearward end pivotally connected by a pin 56 to the arm 52 and carries a piston rod 57 which is pivotally connected to the rearward end of the arm 44 by a pin 58. Another hydraulic cylinder 60 is provided having a rearward end pivotally connected by a pin 61 to the support 54 and carrying a piston rod 62 having a forward end connected through a pin 63 to the arm 52.

It will be appreciated that by control of the supply of fluid to the cylinders 45, 55 and 60, the scraper 13 can be positioned and moved as required for maximum effectiveness in removing material from points in front of the machine and in moving the material to the receiving end of the conveyor structure 15. Thus, for example, the scraper 13 may be moved from the position as indicated in broken lines by reference numeral 13A, thence through the position illustrated in full lines and thence to the position as indicated in broken lines by reference numeral 13B.

In addition to such movements, the scraper 13 may be swung sidewardly about a vertical axis. In particular, the support 54 is controllably rotatable about the axis of a vertical shaft 65, preferably by means of a hydraulic motor shown diagrammatically in FIG. 3. With this arrangement, the scraper 13 may be moved outwardly from a position directly in front of the conveyor 15 to a position ahead of a region on one side of the conveyor 15, thus greatly increasing the width of the path from which material can be removed.

Another important feature is in the provision of a pair of wings 67 and 68 supported from the forward end of the main frame 22. The wings 67 and 68 are supported through actuating means having substantially the same construction. In the arrangement as illustrated, wing 67 is supported from the lower end of a piston rod 69 connected to a piston within a cylinder 70 and having a spline connection thereto. Cylinder 70 is supported from a heavy bracket 71 in a manner such as to permit rotation thereof and of the rod 69 about the axis thereof and cylinder 70 has an arm 72 projecting therefrom which is pivotally connected by a pin 73 to the end of a piston rod 74 actuated by a cylinder 75 which is pivotally connected by pin 76 to the main frame. Thus cylinder 70 controls the vertical position of the wing 67 while cylinder 75 controls the angular position thereof, a similar pair of cylinders being provided for the wing 68 on the opposite side of the machine.

By operation of the cylinders, the wings 67 and 68 may be extended outwardly to positions as illustrated in broken lines and then serve as out-riggers to keep the machine in a stable position in extreme uses. The wings 67 and 68 also serve as a clean-up device to keep the sides of the tunnel clean as the machine moves forwardly, making it unnecessary to return to clean the sides of the tunnel and also insuring a level floor for the tunnel. They are high enough to aid the operator in moving material onto the conveyor and are also quite heavy, to provide added ballast to keep the front wheels down and in engagement with the rails. By way of example, the wings may be on the order of three feet wide and six feet high with a thickness of 4 inches.

The conveyor 15 comprises an endless belt 78 supported on suitable rollers and driven by an electric motor. The belt 78 may be 42 inches wide, by way of example, and the entire conveyor assembly may have a length of approximately 22 feet and an inclination of about 25°, enabling the material to be transferred, elevated and discharged into a 16 cubic foot railroad car 6 and 1-2 feet high. Heavy iron sides 79 and 80 are provided to keep the material on the belt 78 and at the forward end thereof, a heavy inclined plate 81 is provided for sliding movement of the material onto the forward receiving end of the belt 78. A pair of heavy side plates 83 and 84 extend angularly outwardly and forwardly, projecting upwardly from the sides of the plate 81 to provide a receiving mouth of a width greater than the width of the belt 78.

The conveyor structure 15 is preferably pivoted about the axis of a transverse horizontal shaft 85, supported from the frame structure 22, a left cylinder 86 being provided, pivotally connected at its lower end to the frame structure 22 by a pin 87 and having a piston rod 88 connected to the conveyor structure 15 by a pin 89. A support structure 90 on the frame 22 limits downward movement of the conveyor structure 15.

For actuation of the various hydraulic cylinders, a pump and reservoir unit 92 is supported from the frame structure 22 and has a panel 93 connected through lines 94 to the various cylinders.

FIG. 3 is a schematic diagram of the hydraulic control system and electrical circuitry, the heavy lines indicating hydraulic fluid flow lines and the lighter lines indicating electrical connections. A pump 97 is provided having an inlet connected to a reservoir 98 and having an outlet connected to a line 99, a return line 100 being connected to the reservoir 98. Lines 99 and 100 are connected through control valves 101 to 106 to the cylinders 45, 55, 60, a motor 107 for controlling angular movement of the support 54 of the assembly 11 about a vertical axis, cylinder 70 and cylinder 75. Control valves 101-106 are operated by solenoids 109-114 respectively connected to pushbutton pairs 115-116, 117-118, 119-120, 121-122, 123-124 and 125-126. Power supply terminals 127 and 128 are connected to common terminals of the solenoids 109-114 and common terminals of the pushbutton pairs. With this arrangement, each of the hydraulic cylinders or the motor 107 may be operated in either direction by operation of the appropriate pushbutton. For example, pushbutton 115 may be depressed to actuate the valve 101 in a direction to supply fluid to the cylinder 45 to lift the scraper 13 while pushbutton 116 may be depressed to supply fluid in the reverse direction to lower the scraper 13. Thus by operatiaon of the pushbuttons 115-122, the scraper assembly 111 is controlled while by operation of the pushbuttons 123-126 the movement of the wing 67 is controlled. Preferably, the pushbuttons 115-126 may be located in the operators' control unit 19.

A similar arrangement is provided for controlling the scraper assembly 12 and the wing 68, the scraper assembly 12 including cylinders 131, 132 and 133, corresponding to cylinders 45, 55 and 60, a motor 134 corresponding to motor 107, and cylinders 135 and 136 corresponding to cylinders 70 and 75. The cylinders 131-133, motor 134 and cylinders 135 and 136 are connected to control valves 137-142, operated by solenoids 143-148 which are controlled by pushbuttons 159-170, pushbuttons 159-170 being located in the control unit 20.

The control unit 21 includes a pair of pushbuttons 171 and 172 operative through a traction motor control unit 173 to control drive of a pair of electric motors 175 and 176 mechanically coupled to the wheel pairs 25 and 26, the traction motor control unit 173 being connected to power supply terminals 177 and 178.

Control unit 21 also includes a pair of pushbuttons 179 and 180 connected to a winch motor control unit 181 to control energization of a motor 182 connected to the drum 35. In addition, the unit 21 includes pushbuttons 183 and 184 connected to the solenoid 185 for a control valve 186 connected between lines 99 and 100 and the conveyor lift cylinder 86. Finally, the unit 21 may include pushbuttons 187 and 188 connected to a conveyor motor control unit 189 connected to a drive motor 190 for the conveyor belt 78.

With this arrangement, each operator may control one of the scraper assemblies, independently in control of the other and concentrate his efforts to move material as rapidly as possible into the inlet of the conveyor structure to be conveyed to the car 16. Each operator may also control movement of the wing 67 or 68 on his side of the machine. Either operator may control, through the control unit 21, the energization of the traction motors, the drive of the winch, the position of the conveyor structure and the drive of the conveyor. With two operators, the material can be rapidly removed and loaded into the railroad cars. It is possible, however, for one operator to operate the machine, sitting in a central position to operate both control units 19 and 20, or operating such controls alternately.

The various features of the machine are especially advantageous in tunneling operations, particularly in operating on rails, but it will be understood that the machine can be readily modified for other uses, using rubber wheels if desired.

It will be appreciated that other modifications and variations may be effected without departing from the spirit and scope of the novel concepts of this invention.

I claim as my invention:

1. In a material handling machine:
   a. a frame,
   b. means on said frame for supporting the latter for movement on a supporting element,
   c. inclined conveyor means on said frame for carrying material from a forward lower receiving end thereof to a rearward elevated delivery end thereof,
   d. means supported from the forward end portion of said frame for digging into material directly ahead and to opposite sides of said frame and conveyor means and for carrying the material rearwardly to said forward receiving end of said conveyor means,
   e. a pair of wings mounted on opposite sides of said frame for clearing debris along the side of the machine and providing stabilization therefor,
   f. means for pivoting said wings about vertical axes to extend the wings from a retracted position to an operative position,
   g. and means for controllably moving said wings vertically to selectively position the lower wing edges.

2. In a material handling machine:
a. a frame,
b. front and rear wheels on said frame for supporting the latter for movement on rails,
c. conveyor means on said frame for carrying material from a forward end thereof to a rearward delivery end thereof,
d. means supported from the forward end portion of said frame for digging into material ahead of said machine and for carrying the material rearwardly to said forward end of said conveyor means,
e. and combined means for effecting movement of said machine along the rails, said combined means comprising:
 1 drive means for said front wheels,
 2 a rotatable drum and a pulley on said frame and with said drum and pulley disposed behind said front wheels and behind the center of gravity of said machine,
 3. a cable wound at its rearward end on said drum and extending forwardly under said frame and slightly above and generally parallel to the rails,
 4. means for securing the forward end of said cable to the forward end of said rails,
 5. and means to rotate said drum to pull said machine forward and tension said cable to thereby increase traction between said forward wheels and the rails.

3. The material handling apparatus of claim 2 which includes:
a. a pair of wings mounted on opposite sides of said frame for clearing debris along the side of the machine and providing stabilization therefor,
b. means for pivoting said wings about vertical axes to extend the wings from a retracted position to an operative position,
c. and means for controllably moving said wings vertically to selectively position the lower wing edges.

* * * * *